United Stat

Globus et al.

[11] 4,078,860
[45] Mar. 14, 1978

[54] CYCLORAMIC IMAGE PROJECTION SYSTEM

[76] Inventors: Ronald P. Globus; Richard D. Globus; Stephen E. Globus, all c/o Globuscope, Inc., One Union Square West, New York, N.Y. 10003

[21] Appl. No.: 736,130

[22] Filed: Oct. 27, 1976

[51] Int. Cl.$^2$ .............................................. G03B 37/00
[52] U.S. Cl. ...................................... 352/69; 352/156; 350/198; 354/94
[58] Field of Search ........................... 352/69, 86, 156; 35/12 N, 12 W; 350/191, 198; 354/94, 99

[56] References Cited

U.S. PATENT DOCUMENTS

| | | | |
|---|---|---|---|
| 2,972,281 | 2/1961 | Dresser | 352/69 |
| 3,141,397 | 7/1964 | McNeil | 354/99 |
| 3,240,113 | 3/1966 | Stechmesser | 350/198 |
| 3,850,516 | 11/1974 | Mallinson | 350/198 |

FOREIGN PATENT DOCUMENTS

| | | | |
|---|---|---|---|
| 1,026,870 | 4/1966 | United Kingdom | 352/69 |

*Primary Examiner*—Monroe H. Hayes
*Attorney, Agent, or Firm*—Burns, Doane, Swecker & Mathis

[57] ABSTRACT

A cycloramic image projection system in which an image as viewed from a central point, is projected in a complete circle about the viewer's position onto a drum-type screen. Included is a conical reflector arranged concentrically with the optical axis of a circular beam of light projected onto the reflector and which is turned in a radially outward direction and condensed through the picture area of a circular loop of film on a sprocket also concentric with the optical axis and which surrounds the reflector. A toroidal convex lens surrounds the film loop concentrically and serves to focus and project a 360° image of the picture onto the screen, and the film loop is continuously wrapped on and off around the reflector whereby a continuously changing but temporarily stationary 360° image is swept onto and off the screen. The sprocket and reflector are stationary, the toroidal lens is mounted on a pan table which rotates about the optical axis, and an arm on the table serves to pull the film from one reel, feed it through a slit in the lens, thence around the sprocket and back through the slit where it is rewound on the other reel.

6 Claims, 7 Drawing Figures

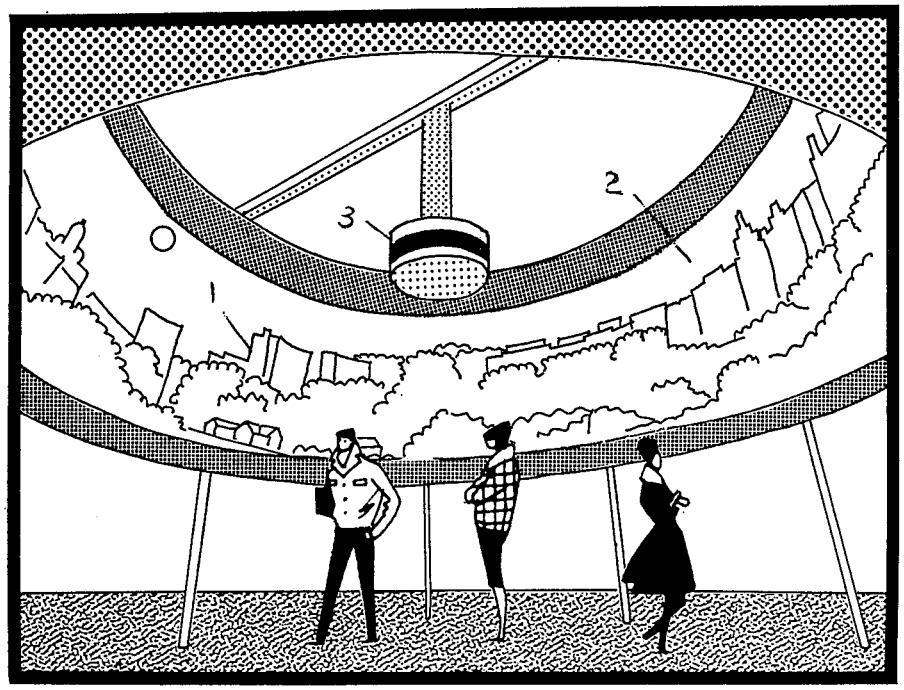
FIG. 1
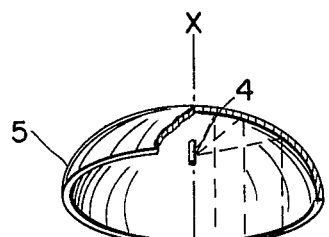
FIG. 2
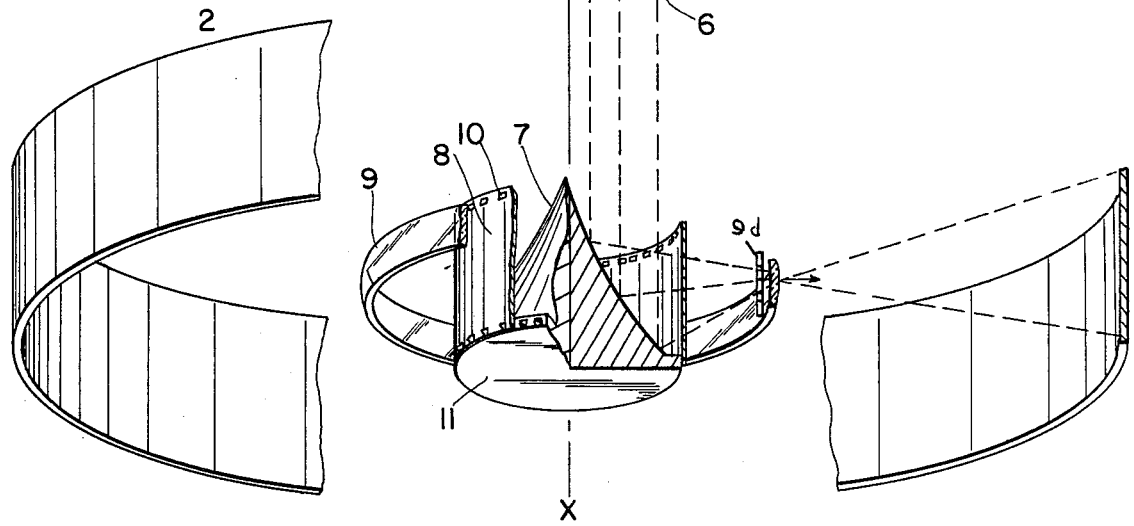

CYCLORAMIC IMAGE PROJECTION SYSTEM

This invention relates to an improvement in a projection system of the type wherein an image, as viewed from a central point, is projected in a complete circle about the spectator's position onto a drum-type screen. This type of image projection is often referred to as "cycloramic."

BACKGROUND OF THE INVENTION

Image projectors of the cycloramic type have been known at least as early as the beginning of the twentieth century and various patents thereon have been granted, among these being French Pat. No. 705,771 to A&L Lumiere (1902) and U.S. Pat. No. 2,068,410 (1937) to F. C. Hanke et al. These two systems utilize multi-image optics but problems arise with respect to reliability, programming and image matching. This is due to the fact that there is more than one optical system and film transport.

Another arrangement for projecting cycloramic images is by the use of some type of wide angle, anamorphic image. In this system a flat film is crawled or advanced rapidly past a light source and lens. The image is then reflected into a prism of rotation such as a sphere or cone. A major disadvantage of this type of system is that a problem of aspect ratio arises, i.e., a very large cylindrical image must be produced by a very small area of film, i.e., the flux (heat per unit area per second) of light being transmitted through the frame has to be extremely high. Projection systems of this type are disclosed, for example, in French Pat. No. 338,386 (1903) and U.S. Pat. No. 2,244,235 (1941) to Ayres.

SUMMARY OF THE INVENTION

The improved cycloramic projection system in accordance with the present invention has none of the disadvantages of prior systems of which I have knowledge and the optics involved enable a bright, clear, non-distorted, and reliable image to be produced in a completely circular mode. The essentials of the novel optics system are a single light source producing a circular beam of light, a single toroidal convex lens concentric with the optical axis, and a single strip of film curved into a circle also concentric with the optical axis and which is located within the toroidal lens and surrounds a cone-shaped reflecting surface also concentric with the optical axis that functions to turn the light beam radially outward throughout a complete circle and pass through the film thus to condense the image on the film into a ring of light which is intercepted by the toroidal convex lens resulting in the projection of a focussed image completely around the circular screen.

The light source can take any one of several forms. It may be formed by a point or line source which is converted into a circular beam by reflection or transmission through lenses or the light source can be constructed in the form of a ring. In the specific embodiment of the invention to be later described in more detail, the light source takes the form of a linear filament which establishes the optical axis for the projection system. Light from the filament is collected and converted into a circular beam by means of a reflector. The reflector may be any one of a family of shapes such as a circle, a parabola, or an ellipse or toroidal shape of revolution. In the specific embodiment to be described in more detail, an elliptical type reflector is chosen for collection of the light from the source and forming it into a columnated beam.

The film which is continuously being wrapped on taken off a stationary sprocket surrounding the cone by means of an orbiting pan table mechanism is supported upon two reels, and as the pan table rotates, an arm projecting from the table functions to guide the film to and from the sprocket through a slit or gate in the toroidal lens which is secured to the pan table, the film being wound off from a "feed" reel and re-wound onto a "take-up" reel.

BRIEF DESCRIPTION OF THE DRAWINGS

A preferred embodiment of cycloramic projection system in accordance with the invention will now be described and is illustrated in the accompanying drawings wherein:

FIG. 1 is an isometric view of a portion of a viewing enclosure and the corresponding portion of a drum-shaped 360° viewing screen together with a general view of the projection apparatus which depends from an overhead hanger;

FIG. 2 is a schematic view to illustrate the novel optics involved in projecting a 360° image onto the screen from a film strip;

DETAILED DESCRIPTION

Figure 3:
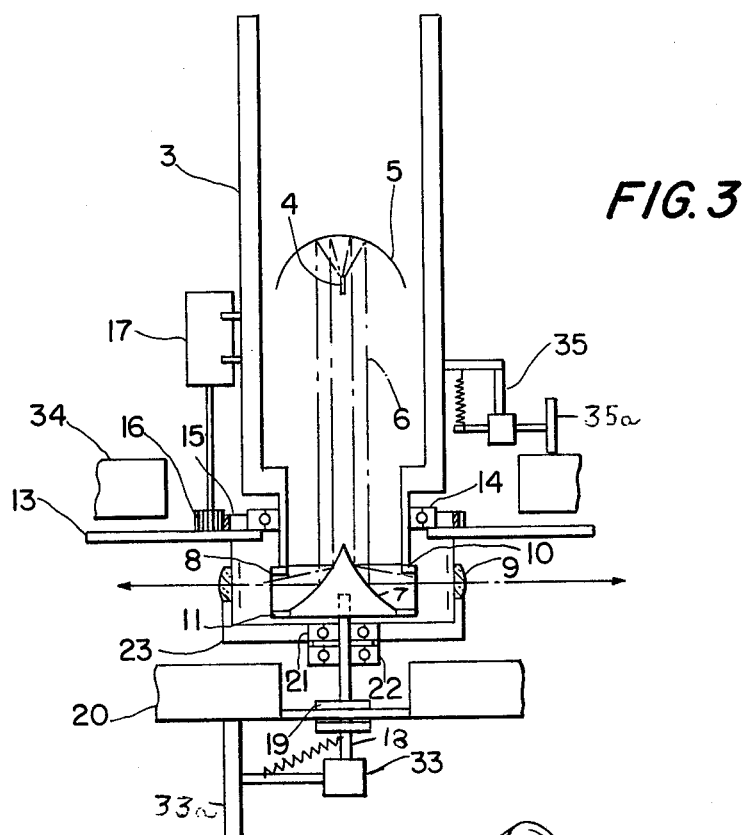
FIG. 3 is also a schematic view showing the basics of the optics involved as well as the general arrangement of the motor driven pan table, the support structure for the cone and toroidal lens, and also the arrangement of the two reels above and below the pan table together with the 1-way clutches for the reels.

With reference now to the drawings, and in particular to FIG. 1, the 360° screen on which the image 1 is projected is formed by the inner periphery of a drum 2 and is located at such a height off the floor that it can be easily viewed all around by persons standing in the vicinity of the center.

The projection system located within a housing 3 is supported in a depending manner along the screen axis at a level corresponding to the mid-line of the width of the screen.

The basics of the novel optics system is illustrated schematically in FIG. 2. Here it will be seen that a linear filament type light source 4 establishing an optical axis $x - x$ is placed at the inside focus of an elliptical type reflector 5 resulting in the projection of a columnated circular light beam 6 onto the surface of a cone 7 concentric with the optical axis. Cone 7 has a concave generatrix line. The columnated beam of light striking the surface of the cone for reflection in all directions from the optical axis must be condensed through the picture area of a substantially 360° loop of film 8 held on upper and lower stationary sprockets 10 and 11 also concentric with the optical axis and which surround cone 7. Sprocket 10 is secured to the general housing structure 3 and sprocket 11 is secured to the base of the cone 7. The condensed beam is then focused through a slit iris 9d and toroidal plano-convex lens 9 and projected onto the screen 2.

It has been found that an elliptical curvature for the concave generatrix line of the cone serves this purpose quite well. One focus on the ellipse was chosen as a very distant point above the cone lying on the optical axis $x - x$. The other focus is the point at which the light beam condenses to a ring-shaped line. By graphically plotting an ellipse with a string I have been able to estimate an ellipse which will serve the intended purpose. This latter point coincides with a straight projection of the center of the film held on the gate (projection film center) and has been found to lie on a 45° angle to the projection film center. The radius of swing of the cone is from six to seven inches.

The toroidal lens 9 inverts the image cast through the film 8. However, it does not reverse, i.e., flip-over the image from right-to-left on the gate. That is to say every image point lying on a vertical line is focused by the toroidal lens, and every image point lying on the horizontal is focused by the linear light source.

The principal plane of the toroidal lens must fall in between the film 8 and the focused ring of light. The curvature of the convexed surface 9a of the lens is designed in such manner as to maintain the aspect ratio of the gate on the drum-shaped screen 2. This means that a non-amorphic image, i.e., a normal non-distorted image, can be used.

The magnification factor M of the image on the circular strip is equal to the ratio of the diameter of the viewing screen 2 to the diameter of the gate. As an example, for a circular viewing room having a diameter of 17 ft., this turned out to be 54.543.

The radius of the screen 2 is equal to the radius (A) of the gate plus the distance (B) between the gate and screen, i.e., the radius of the screen is equal to $A + B$.

In order to maintain focus, the magnification ratio must equal B/A.

By substitution, $B = 54.543A$, one solves the equation determining A and B. Thus, for the assumed 17 ft. diameter room, $A = 1.835$ and $B = 98.255$.

From basic optics, the focal length of the toroidal lens 9 is equal to $B/(M + 1)$.

By substitution, a typical focal length of 1.8 is obtained.

Using the lens maker's equation:

$$1/F = (N-1)/R = 1/1.8$$

where: N = the index of refraction of the lens, and R = the radius of curvature of the lens one obtains a radius of 0.846".

The toroidal plano-convex lens 9 was made from any suitable material. A Pyrex type stock was actually used. The external diameter of the lens, at the convex side 9a is 7.56" and the internal diameter at the plane side 9b is 6.898". The width of the lens, i.e., the dimension in the direction of the axis $x - x$ is 0.9". The lens 9 includes a radially extending slot 9c 0.35" wide through which extends the film loop 8a that is continuously wrapped onto and off the supporting sprockets 10 and 11 surrounding the cone 7.

The drum type screen 2 is made from a suitable and conventional reflective or transmittive rear screen material. The center of the screen is located on the axis $x - x$ of the optical system. The aspect ratio of the height to the circumference of the screen should match the aspect ratio of the height to the circumference of the film strip on the gate.

Figure 5:
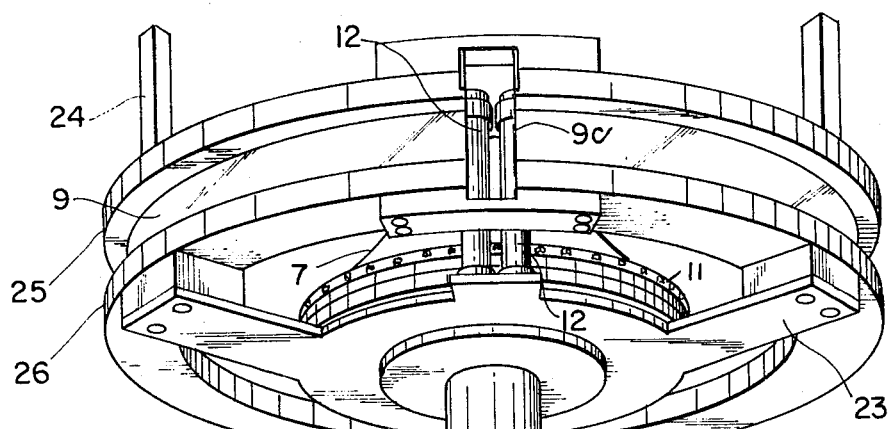
FIG. 5 is a perspective view showing the film sprocket and sub-assembly of the support for the cone and toroidal lens which is mounted to the underside of the pan table.

The film 8 wrapped around sprockets 10 and 11 to form loop 8a which is held in contact with the sprockets by a pair of gate rollers 12 in alignment with the gate slot 9c in the toroidal lens 9 as shown in FIG. 5 results in projection of the cycloramic image 1 onto the viewing screen 2. The gate rollers 12 and toroidal lens 9 orbit the optical axis $x - x$ as a unit and film is continuously wrapped onto and off the sprocket. The image on the film remains stationary until it is wrapped off the screen by the gate rollers and therefore a continuously changing, but temporarily stationary, 360° image is swept onto and off the screen.

For providing the necessary orbiting action of the gate rollers 12 and toroidal lens 9, an annular pan table 13 is provided. This table is mounted to the overall stationary housing and support structure 3 by means of a ball bearing 14 for rotation about the optical axis $x - x$, the table being secured to the outer race of this bearing as depicted schematically in FIG. 3. A ring gear 15 mounted at the upper side of the table concentric with the optical axis is meshed with a pinion gear 16 driven by a reversible electrical motor 17 secured to the support structure 3.

The cone 7, its shaft 18 and a two-way slip clutch 19 which serves to couple the cone to one of the two reels, later referred to as the "take-up" reel 20, are held in place by two axially spaced ball bearing assemblies 21, 22 held in a yoke 23. As shown schematically in FIG. 3 and more specifically in FIG. 5, the yoke 23 and toroidal lens 9 are secured to the underside of the pan table 13 by way of adjustable feet 24 for purposes of leveling, the details including two annular plates 25, 26 between which the toroidal lens 9, is secured, the lower plate 26 being secured to yoke 23 and the upper plate 25 to the adjustable feet 24.

Figure 6:
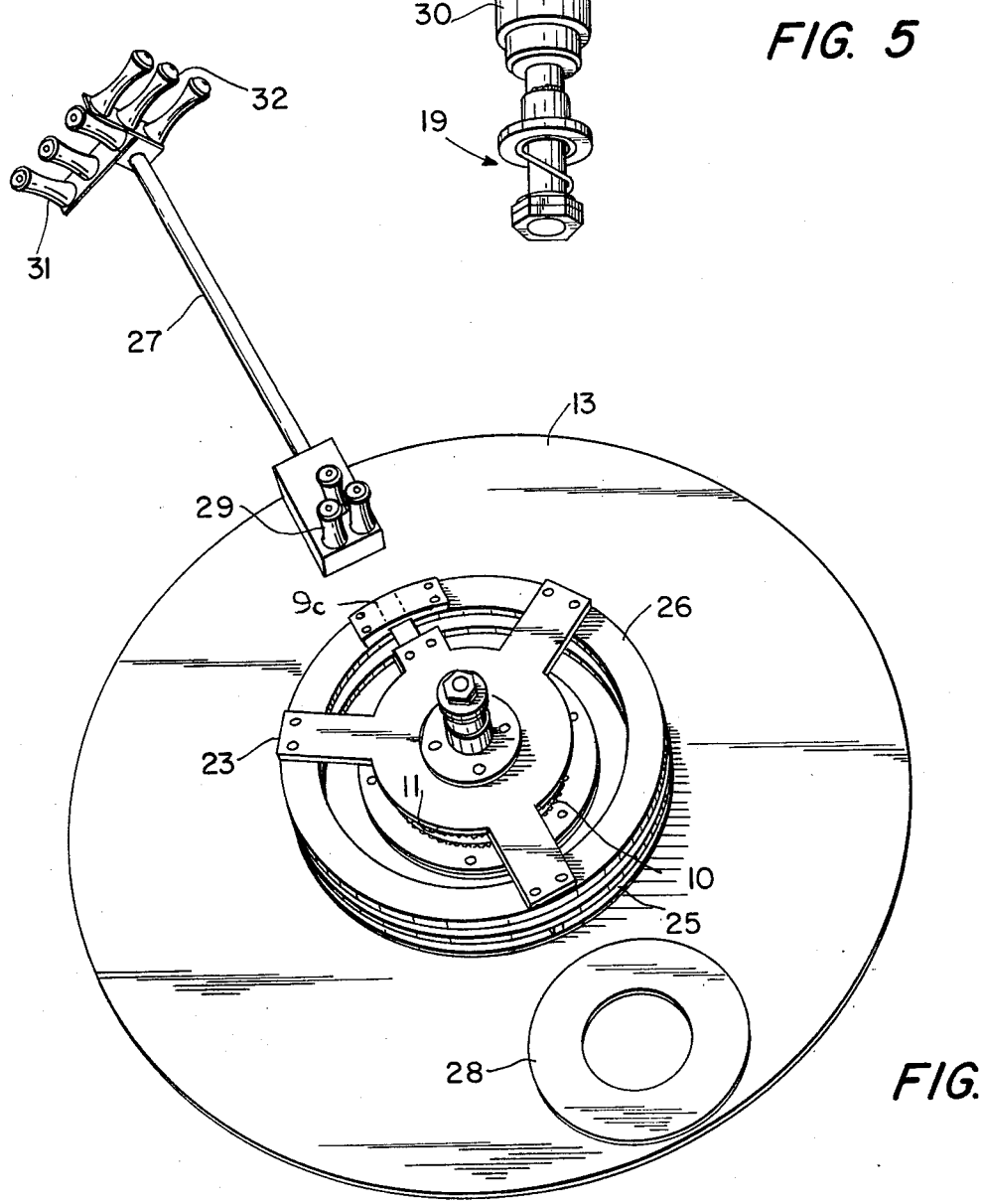
FIG. 6 is a perspective view of the pan table and its film guiding arm, as well as the sub-assembly of the toroidal lens connected to it, and the stationary sprocket.
Figure 7:
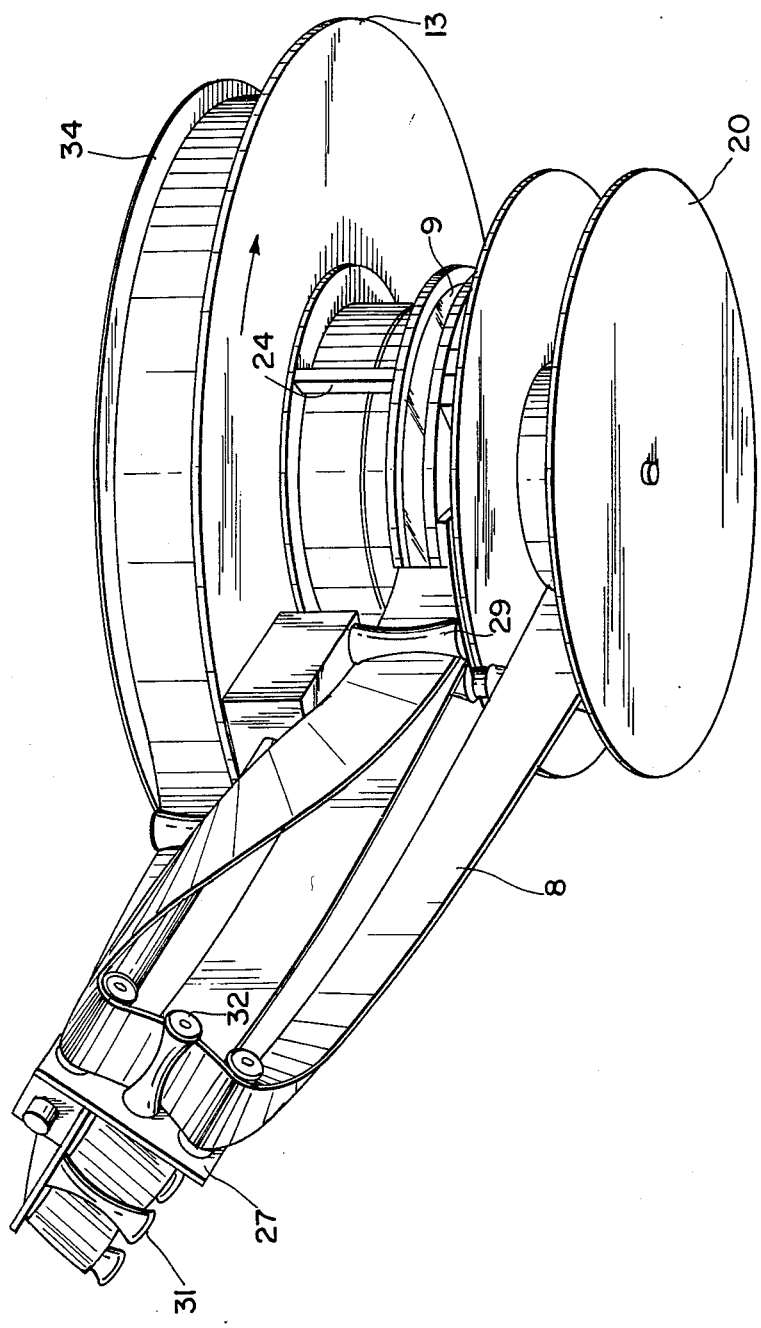
FIG. 7 is a perspective view showing the pan table assembly in association with the two reels and the film as it is pulled off from one reel and re-wound upon the other after passing through the gate and around the sprocket.

Secured to the underside of the pan table 13, as shown in FIG. 6, is an arm 27 which serves to transport the film into and out of the film gate rollers 12 and through the slot 9c in the toroidal lens 9 to the sprockets 10, 11. Located opposite this arm is a counterweight 28 which balances out any centrifugal forces developed by rotation of the arm thus providing for rotation of the arm and pan table in a vibration-free manner. Located at the inner end of arm 27 is a nest of rollers 29 over which the film is passed and guided on its way into and out of the film gate. Two other nests of rollers 31, 32 located at the outer end of the arm function to bend and change the direction of the film as it winds off one reel and re-winds onto the other.

A 1-way roller type clutch mechanism 33 is mounted on the stationary cone shaft 18 and its roller 33a rides on the bottom of the previously referred to "take-up" reel 20 which is mounted for rotation on the housing 30 for bearing 21, 22. This clutch spins free to permit reel 20 to rotate in one direction but imposes a drag on the reel in the opposite direction.

The other reel 34 which may be referred to as the "feed" reel, i.e., the reel from which the film is pulled, is supported at the upper side of the pan table by three grooved rollers. The friction established by these rollers imposes a drag on the reel for the projection mechanism to operate in the forward, i.e., unreeling mode. Attached to the main housing structure 3 is another 1-way roller type clutch 35 and its roller 35a rides on the top of reel 34. This clutch spins free to permit reel 34 to rotate in one direction but imposes an additional drag on the reel in the opposite direction.

Figure 4:
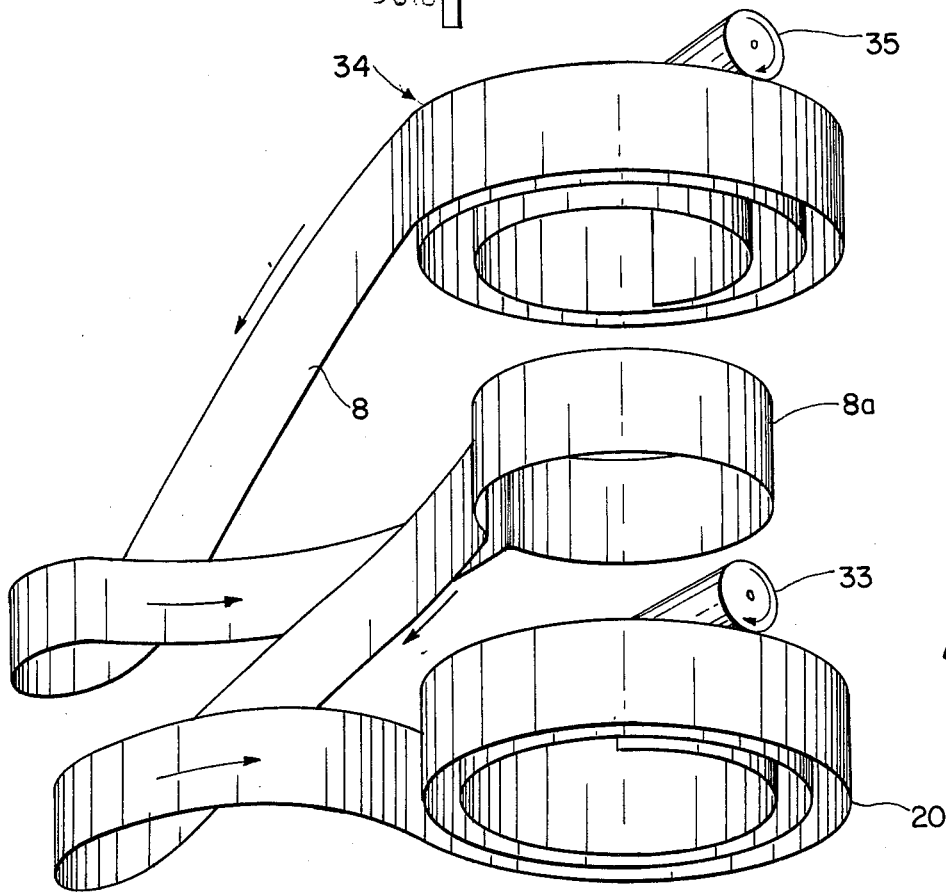
FIG. 4 is a perspective view illustrating the course of travel of the film from one reel to another.

Thus, as shown in FIG. 4, when pan table 13 rotates in one direction reel 34 on which the film is stored rotates with a drag effect so that film is wound off, and rewound on reel 20 after the film has passed through the film gate and wound on and off the sprockets 10, 11. When the pan table rotates in the opposite direction reel 34 is then clutched and film is wound onto it from reel 20 which is then unclutched and rotates with a drag effect imposed by clutch 19. Therefore the machine is bi-directional, i.e., it can operate in the forward or reverse mode.

In conclusion, while a preferred embodiment of the cycloramic image projection system in accordance with the invention has been disclosed, modifications can be adopted. As an example, an alternative arrangement would be to hold the pan table stationary, drive the two sprockets and reflector in rotation with the film and insert a shutter in the light beam, the remaining components being unaltered.

We claim:

1. A cycloramic projection system wherein an image as viewed from a central point is projected in a complete circle about a spectator's position from a single film, which comprises a light source, means for forming the light into a circular beam, a conical reflector arranged concentrically with the optical axis of said light beam and receiving light therefrom which is turned in a radially outward direction and condensed through the picture area of a circular loop of film concentric with the optical axis and which surrounds said reflector, a toroidal convex lens concentric with the optical axis and surrounding the film loop through which a 360° image of the picture thereon is focussed and projected onto a circular screen, and means for continuously wrapping the film loop on and off around said reflector whereby a continuously changing but temporarily stationary 360° image is swept onto and off the screen.

2. A cycloramic projection system wherein an image as viewed from a central point is projected in a complete circle about a spectator's position from a single film comprising a pair of film storage reels mounted in parallel spaced concentric relation, a conical reflector located between said reels and concentric therewith, means for drawing film off one reel and re-winding it on the other, and means for continuously wrapping a loop of film on and off around said reflector as it passes from one of said reels to the other.

3. A cycloramic projection system wherein an image as viewed from a central point is projected in a complete circle about a spectator's position from a single film comprising a pair of film storage reels mounted in parallel spaced relation, a conical reflector located between said reels and concentric therewith, an annular rotatable pan table mounted concentrically with said reflector, means for rotating said pan table, a toroidal convex lens concentricaly surrounding said reflector and which is mounted on said pan table, means including a film guide arm on said pan table for continuously wrapping a loop of film on and off around said reflector through a slit in said lens as the film is pulled off one reel and rewound on the other, and means for projecting a circular beam of light in an axial direction through the opening in said pan table onto said reflector and which is turned thereby into a radially outward direction and condensed through the picture area of said film loop, said lens serving to focus a 360° image of the film loop, and a circular viewing screen surrounding said lens whereby a continuously changing but temporary stationary 360° image is swept onto and off said screen.

4. A cycloramic projection system as defined in claim 3 wherein said film guide arm on said pan table includes an arrangement of roller nests located at the outer and inner ends thereof for guiding the film in its movement from one reel to the other and through a film gate aligned with the slit in said lens through which a loop of the film is wrapped about said reflector.

5. A cycloramic projection system as defined in claim 3 and which further includes roller type one-way clutches operatively connected to said reels respectively.

6. A cycloramic projection system as defined in claim 3 and which further includes a film sprocket surrounding said conical reflector and a pair of gate rollers aligned with the slit in said lens through which a loop of the film is wrapped about the sprocket and reflector.

* * * * *